(12) United States Patent
Umayahara et al.

(10) Patent No.: US 11,342,568 B2
(45) Date of Patent: May 24, 2022

(54) FUEL CELL VEHICLE AND METHOD USING FUEL CELL VEHICLE

(71) Applicant: TOYOTA JIDOSHA KABUSHIKI KAISHA, Toyota (JP)

(72) Inventors: Kenji Umayahara, Miyoshi (JP); Shigeki Takaiwa, Toyota (JP); Masahiro Yamakawa, Toyota (JP); Hideshi Mizutani, Toyota (JP); Takao Ozawa, Toyota (JP); Shigeyuki Suzuki, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 129 days.

(21) Appl. No.: 16/553,545

(22) Filed: Aug. 28, 2019

(65) Prior Publication Data

US 2020/0091524 A1   Mar. 19, 2020

(30) Foreign Application Priority Data

Sep. 14, 2018   (JP) .............................. JP2018-172312

(51) Int. Cl.
*H01M 8/04089*   (2016.01)
*H01M 8/04537*   (2016.01)
(Continued)

(52) U.S. Cl.
CPC .......... *H01M 8/04097* (2013.01); *B60L 3/00* (2013.01); *B60L 58/30* (2019.02);
(Continued)

(58) Field of Classification Search
CPC ......... H01M 8/04097; H01M 8/04619; H01M 8/04201; H01M 8/04111; H01M 2250/20;
(Continued)

(56) References Cited

U.S. PATENT DOCUMENTS

2011/0214930 A1* 9/2011 Betts ................. H01M 10/6561
180/65.1
2014/0347018 A1* 11/2014 Boblett ................... B60L 53/14
320/162
(Continued)

FOREIGN PATENT DOCUMENTS

JP   2002-063695      2/2002
JP   2016-187261 A   10/2016
(Continued)

*Primary Examiner* — Milton I Cano
*Assistant Examiner* — Jenna Shulman
(74) *Attorney, Agent, or Firm* — Finnegan, Henderson, Farabow, Garrett & Dunner, LLP (57) ABSTRACT

A fuel cell vehicle includes a fuel cell, a hydrogen tank, a driving motor, a power feeder and a controller. The controller is configured to: obtain current location information of the fuel cell vehicle, hydrogen supply position information, a fuel consumption of the fuel cell vehicle in a drive mode, a remaining amount of hydrogen stored in the hydrogen tank, and a consumed amount of hydrogen per unit time in a power feed mode; calculate an amount of hydrogen that is required for the fuel cell vehicle to drive from the current location to the supply position; calculate a power feedable time period when the fuel cell vehicle is operable in the power feed mode without causing the remaining amount of hydrogen to become less than the required amount of hydrogen, and display information with regard to the power feedable period.

6 Claims, 5 Drawing Sheets

(51) Int. Cl.
*H01M 8/04082* (2016.01)
*H01M 8/04111* (2016.01)
*B60L 3/00* (2019.01)
*B60L 58/30* (2019.01)

(52) U.S. Cl.
CPC .... *H01M 8/04111* (2013.01); *H01M 8/04201* (2013.01); *H01M 8/04619* (2013.01); *H01M 2250/20* (2013.01)

(58) Field of Classification Search
CPC .... H01M 8/04313; Y02T 10/70; Y02T 90/40; B60L 50/70; B60L 50/72; B60L 58/30; B60L 3/00
See application file for complete search history.

(56) References Cited

U.S. PATENT DOCUMENTS

| | | |
|---|---|---|
| 2017/0050534 A1 | 2/2017 | Kanazawa et al. |
| 2017/0255667 A1* | 9/2017 | Ochiai ................ G06F 16/2358 |
| 2017/0282906 A1* | 10/2017 | Abe ........................ B60L 53/80 |
| 2018/0029498 A1 | 2/2018 | Taruya et al. |
| 2019/0308510 A1* | 10/2019 | Beaurepaire ........... B60K 35/00 |

FOREIGN PATENT DOCUMENTS

| | | |
|---|---|---|
| JP | 2017-041966 A | 2/2017 |
| JP | 2018-019571 A | 2/2018 |

\* cited by examiner

FUEL CELL VEHICLE AND METHOD USING FUEL CELL VEHICLE

CROSS REFERENCE TO RELATED APPLICATIONS

This application claims priority to Japanese Patent Application No. 2018-172312, filed Sep. 14, 2018, the disclosure of which is incorporated by reference herein in its entirety.

BACKGROUND

Field

The present disclosure relates to a fuel cell vehicle and a method using the fuel cell vehicle.

Related Art

For example, JP 2002-063695A discloses a system configured to send and receive stock information and location information between each mobile vending vehicle and a supplier vehicle used to supply commodities or between each mobile vending vehicle and a home base and to give an instruction to supply commodities to a mobile vending vehicle that has less commodities in stock.
Patent Literature 1: JP2002-063695A The system described above manages the stock information of the mobile vending vehicle but does not take into account the remaining amount of a fuel. When a fuel cell vehicle is used as a mobile vending vehicle or the like, hydrogen used as a fuel may be consumed for applications other than driving; for example, electric power generated by the fuel cell may be used for business. In the current state, there are only a small number of hydrogen stations. In some cases, a large amount of hydrogen may thus be required for the fuel cell vehicle to be driven to a nearest hydrogen station. There is accordingly a likelihood that the fuel cell vehicle fails to reach a nearest hydrogen station after termination of business, due to insufficiency of hydrogen for driving.

SUMMARY

According to one aspect of the present disclosure, there is provided a fuel cell vehicle. This fuel cell vehicle comprises a fuel cell; a hydrogen tank configured to supply hydrogen to the fuel cell; a driving motor driven with electric power generated by the fuel cell; a power feeder configured to supply the electric power generated by the fuel cell to an external load; and a controller configured to control an operation mode of the fuel cell vehicle between a drive mode that supplies electric power to the driving motor and a power feed mode that supplies electric power to the power feeder. The controller is configured to: obtain current location information with regard to a current location of the fuel cell vehicle, supply position information with regard to a supply position where the fuel cell vehicle receives a supply of hydrogen, a fuel consumption of the fuel cell vehicle in the drive mode, a remaining amount of hydrogen stored in the hydrogen tank, and a consumed amount of hydrogen per unit time in the power feed mode; use the current location information and the supply position information to calculate a required amount of hydrogen that is required for the fuel cell vehicle to drive from the current location to the supply position in the drive mode; use the required amount of hydrogen, the remaining amount of hydrogen, and the consumed amount of hydrogen per unit time in the power feed mode to calculate a power feedable period that denotes a time period when the fuel cell vehicle is operable in the power feed mode without causing the remaining amount of hydrogen to become less than the required amount of hydrogen; and display information with regard to the power feedable period.

DETAILED DESCRIPTION

A. First Embodiment

Figure 1:
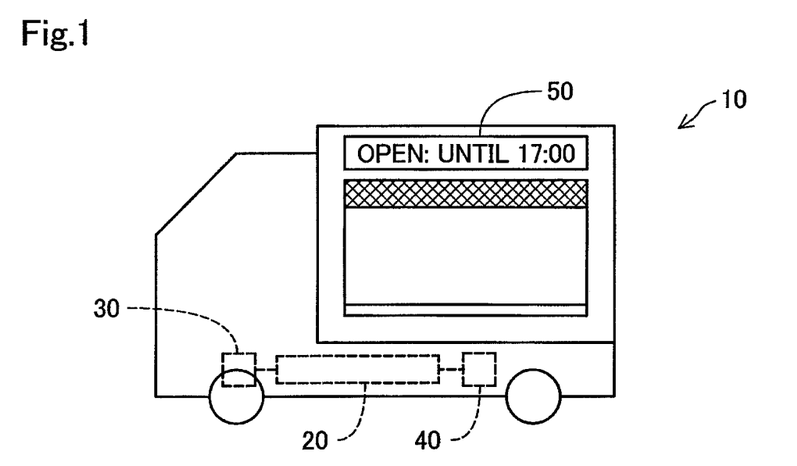
FIG. 1 is a diagram illustrating the schematic configuration of a fuel cell vehicle according to a first embodiment.

FIG. 1 is a diagram illustrating the schematic configuration of a fuel cell vehicle 10 according to a first embodiment. The fuel cell vehicle 10 of this embodiment includes a fuel cell system 20, a driving motor 30, a power feeder 40 and a display unit 50. The fuel cell vehicle 10 of the embodiment is operated in either of a drive mode that supplies electric power obtained from the fuel cell system 20 to the driving motor 30 and a power feed mode that supplies electric power obtained from the fuel cell system 20 to the power feeder 40.

The fuel cell vehicle 10 according to this embodiment is a mobile vending vehicle used for mobile vending. The mobile vending is a type of retailing business that sells commodities at a place other than a permanently installed shop, for example, by a vehicle with the commodities or their raw materials mounted thereon. One example of mobile vending is selling hot dogs by a mobile vending vehicle parked, for example, in a parking place of a park or on the road of a business district. The mobile vending vehicle is provided with bread, sausages and the like as raw materials of hot dogs and is configured to cook the hot dogs by using electromagnetic cookers provided in the mobile vending vehicle.

According to the embodiment, a counter used for mobile vending is provided on one side face of the fuel cell vehicle 10. According to the embodiment, the display unit 50 is an electronic message board provided above the counter on the side face of the fuel cell vehicle 10. Various pieces of information including business hours of mobile vending are displayed on the display unit 50.

Figure 2:
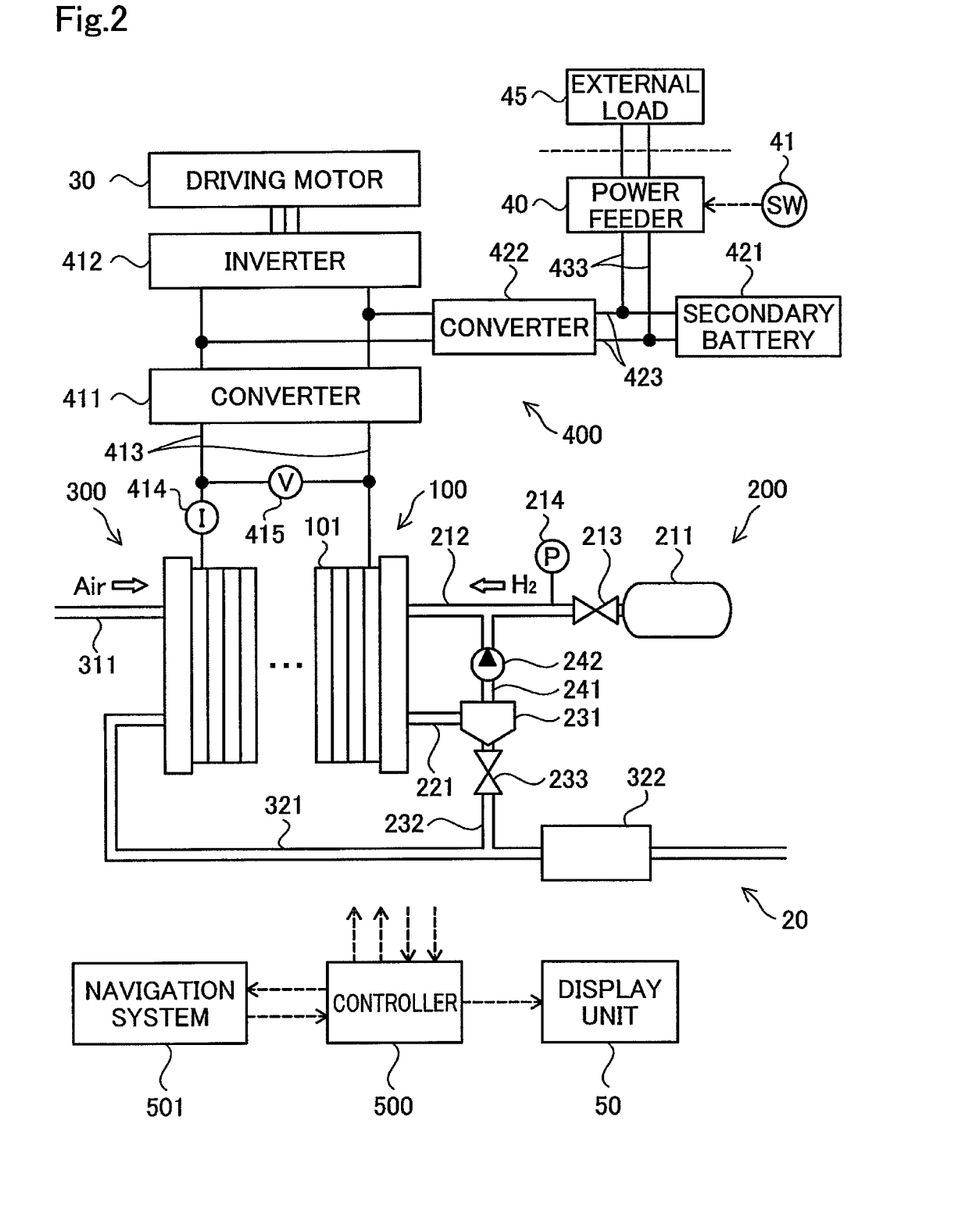
FIG. 2 is a diagram illustrating the schematic configuration of a fuel cell system according to the first embodiment.

FIG. 2 is a diagram illustrating the schematic configuration of the fuel cell system 20 according to the first embodiment. The fuel cell system 20 of this embodiment includes a fuel cell 100, a hydrogen gas supply discharge system 200, an air supply discharge system 300 and an electric power supply system 400.

According to the embodiment, the fuel cell 100 is a polymer electrolyte fuel cell. The fuel cell 100 generates electricity through electrochemical reactions. According to the embodiment, reactive gases of the fuel cell 100 are hydrogen gas used as a fuel gas and the air used as an oxidizing gas. The fuel cell 100 has a stack structure formed by stacking a plurality of unit cells 101 and connecting the respective unit cells 101 in series. Each of the unit cells 101 includes a membrane electrode assembly with electrode catalyst layers provided on respective surfaces of an electrolyte membrane, and a pair of separators placed across the membrane electrode assembly. An anode flow path is formed between the membrane electrode assembly and the separator on an anode side to allow the hydrogen gas to flow through. A cathode flow path is formed between the membrane electrode assembly and the separator on a cathode side to allow the air to flow through.

The hydrogen gas supply discharge system 200 includes a hydrogen tank 211, a hydrogen supply flow path 212, a main stop valve 213, a pressure sensor 214, a hydrogen discharge flow path 221, a gas liquid separator 231, a hydrogen circulation flow path 241, a hydrogen circulation pump 242, an exhaust drainage flow path 232, and an exhaust drainage valve 233. Hydrogen gas that is to be supplied to the fuel cell 100 is stored in the hydrogen tank 211. The hydrogen supply flow path 232 denotes a flow path arranged to connect the hydrogen tank 211 with an inlet of the anode flow path of the fuel cell 100. The hydrogen supply flow path 212 is provided with the main stop valve 213 and the pressure sensor 214 in this sequence. Opening the main stop valve 213 causes the hydrogen gas stored in the hydrogen tank 211 to be supplied through the hydrogen supply flow path 212 to the anode flow path of the fuel cell 100.

The hydrogen discharge flow path 221 denotes a flow path arranged to connect an outlet of the anode flow path of the fuel cell 100 with the gas liquid separator 231. An anode off-gas discharged from the fuel cell 100 flows through the hydrogen discharge flow path 221. The anode off-gas includes nitrogen gas and water generated in the process of power generation by the fuel cell 100, in addition to unused hydrogen gas. The gas liquid separator 231 serves to separate the unused hydrogen gas included in the anode off-gas from the nitrogen gas and the generated water.

The hydrogen circulation flow path 241 denotes a flow path arranged to connect the gas liquid separator 231 with between the pressure sensor 214 and the fuel cell 100 in the hydrogen supply flow path 212. The hydrogen circulation flow path 241 is provided with the hydrogen circulation pump 242. The hydrogen gas separated from the anode off-gas by the gas liquid separator 231 is circulated to the hydrogen supply flow path 212 by means of the hydrogen circulation pump 242.

The exhaust drainage flow path 232 denotes a flow path arranged to connect the gas liquid separator 231 with between the fuel cell 100 and a muffler 322 in an air discharge flow path 321. The exhaust drainage flow path 232 is provided with the exhaust drainage valve 233. Opening the exhaust drainage valve 233 causes the anode off-gas to be discharged to the air discharge flow path 321.

The air supply discharge system 300 includes an air supply flow path 311, the air discharge flow path 321 and the muffler 322. The air supply flow path 311 denotes a flow path connected with an inlet of the cathode flow path of the fuel cell 100. The air introduced from the atmosphere into the air supply flow path 311 is supplied to the cathode flow path of the fuel cell 100.

The air discharge flow path 321 denotes a flow path connected with an outlet of the cathode flow path of the fuel cell 100. The air discharge flow path 321 is provided with the muffler 322 for silencing. A cathode off-gas discharged from the fuel cell 100 flows through the air discharge flow path 321. The cathode off-gas includes water generated in the process of power generation by the fuel cell 100, in addition to the air. The anode off-gas flows through the exhaust drainage flow path 232 into an upstream side of the muffler 322 in the air discharge flow path 321. The cathode off-gas and the anode off-gas flowing through the air discharge flow path 321 are discharged to the atmosphere via the muffler 322.

The electric power supply system 400 includes a boost converter 411, an inverter 412, an ammeter 414, a voltmeter 415, a secondary battery 421, a step-up/down converter 422 and the power feeder 40. The fuel cell 100, the boost converter 411 and the inverter 412 are electrically connected in this sequence by means of a first wiring 413. The ammeter 414 configured to measure an output current of the fuel cell 100 and the voltmeter 415 configured to measure an output voltage of the fuel cell 100 are electrically connected between the fuel cell 100 and the boost converter 411 in the first wiring 413. The secondary battery 421, the step-up/down converter 422, and a position between the boost converter 411 and the inverter 412 in the first wiring 413 are electrically connected in this sequence by means of a second wiring 423. The power feeder 40 and a position between the secondary battery 421 and the step-up/down converter 422 in the second wiring 423 are electrically connected by means of a third wiring 433.

In the drive mode of the fuel cell vehicle 10, DC power generated by the fuel cell 100 is stepped up by the boost converter 411, is converted into three-phase AC power by the inverter 412 and is then supplied to the driving motor 30. The DC power generated by the fuel cell 100 and stepped up by the boost converter 411 may be stepped down by the step-up/down converter 422 and may then be charged into the secondary battery 421. The secondary battery 421 used may be, for example, a nickel metal hydride battery or a lithium ion battery. The DC power charged into the secondary battery 421 is stepped up by the step-up/l down converter 422, is converted into three-phase AC power by the inverter 421 and is then supplied to the driving motor 30.

In the power feed mode of the fuel cell vehicle 10, the DC power generated by the fuel cell 100 is stepped up by the boost converter 411, is stepped down by the step-up/down converter 422 and is then supplied to the power feeder 40. The power feeder 40 may not receive the electric power generated by the fuel cell 100 but may receive a supply of electric power charged in the secondary battery 421. The electric power supplied to the power feeder 40 is supplied to an external load 45 that is connected with a connector provided in the power feeder 40. The term "external load" herein is not limited to loads placed outside of a fuel cell vehicle but also includes loads mounted on the fuel cell vehicle. These loads mounted on the fuel cell vehicle exclude loads generally mounted on the fuel cell vehicle, such as a car air conditioner and a car audio set, but denote loads additionally mounted on the fuel cell vehicle, for example, electromagnetic cookers mounted on the fuel cell vehicle to be used for mobile vending operations. According to the embodiment, electromagnetic cookers mounted on the fuel cell vehicle 10 to be used for mobile vending operations are connected as the external load 45. The power feeder 40 is provided with a power feeding switch 41 operated to change over the operation mode between the drive mode and the power feed mode.

A controller 500 is configured by a computer including a CPU, a memory and an input/output interface. A navigation system 501 provided with a GNSS receiver is connected with the controller 500. The CPU executes a control program stored in the memory to control the operation mode of the fuel cell vehicle 10 between the drive mode and the power feed mode. The CPU also executes a control program stored in the memory to perform a power feedable period display process.

Figure 3:
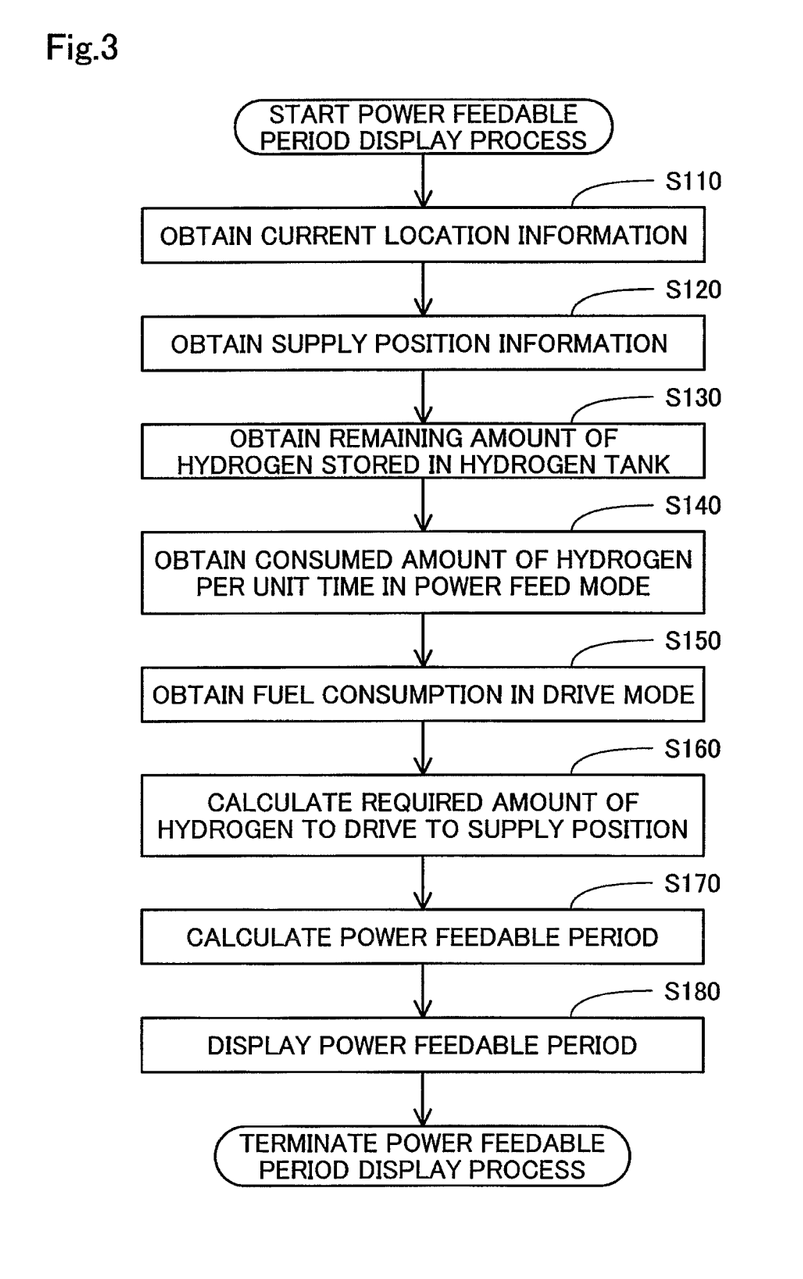
FIG. 3 is a process chart showing a procedure of a power feedable period display process according to the first embodiment.

FIG. 3 is a process chart showing a procedure of the power feedable period display process according to the embodiment. This process is repeatedly performed at predetermined time intervals by the controller 500 in a time period when the fuel cell vehicle 10 is in the power feed mode. The predetermined time interval is, for example, 1 second.

The controller 500 first obtains current location information with regard to a current location of the fuel cell vehicle 10 (step S110). According to the embodiment, the controller 500 uses signals from satellites received by the GNSS receiver of the navigation system 501 to obtain the location information of the fuel cell vehicle 10. GNSS is an acronym of Global Navigation Satellite System.

The controller 500 subsequently obtains supply position information with regard to a supply position where the fuel cell vehicle 10 receives a supply of hydrogen (step S120). According to the embodiment, supply position information is stored in advance in the navigation system 501. The controller 500 uses the current location information obtained at step S110 to extract position information of a nearest supply position out of the supply position information stored in the navigation system 501. According to another embodiment, the controller 500 may obtain supply position information set in advance by a driver, in place of extracting the nearest supply position.

After the processing of step S120, the controller 500 obtains the remaining amount of hydrogen stored in the hydrogen tank 211 (step S130). According to the embodiment, the controller 500 uses a pressure value detected by the pressure sensor 214 to obtain the remaining amount of hydrogen stored in the hydrogen tank 211.

After the processing of step S130, the controller 500 obtains a consumed amount of hydrogen per unit time in the power feed mode (step S140). According to the embodiment, the controller 500 uses the output current of the fuel cell 100 measured by the ammeter 414 and the output voltage of the fuel cell 100 measured by the voltmeter 415 to calculate electric power generated by the fuel cell 100. The controller 500 subsequently refers to a map that is stored in advance in the memory and that indicates a relationship between the electric power generated by the fuel cell 100 and the consumed amount of hydrogen, to obtain the consumed amount of hydrogen per unit time in the power feed mode. The map indicating the relationship between the electric power generated by the fuel cell 100 and the consumed amount of hydrogen may be set by a test that is performed in advance. According to another embodiment, the controller 500 may use a function representing the relationship between the electric power generated by the fuel cell 100 and the consumed amount of hydrogen to calculate the consumed amount of hydrogen per unit time in the power feed mode, in place of referring to the map.

After the processing of step S140, the controller 500 obtains a fuel consumption of the fuel cell vehicle 10 in the drive mode (step S150). According to the embodiment, the controller 500 uses a mileage of the fuel cell vehicle 10 in the drive mode 10 and a change in remaining amount of hydrogen stored in the hydrogen tank 211 to obtain the fuel consumption of the fuel cell vehicle 10 in the drive mode.

After the processing of step S150, the controller 500 uses the current location information, the supply position information and the fuel consumption of the fuel cell vehicle 10 in the drive mode to calculate a required amount of hydrogen that denotes an amount of hydrogen required for the fuel cell vehicle 10 to drive from the current location to the supply position in the drive mode (step S160). According to the embodiment, the controller 500 uses the current location information, the supply position information and map information stored in advance in the navigation system 501 to set a driving route from the current location to the supply position. The controller 500 subsequently uses the set driving route and the fuel consumption of the fuel cell vehicle 10 in the drive mode to calculate the required amount of hydrogen that is required for the fuel cell vehicle 10 to drive from the current location to the supply position in the drive mode. The controller 500 may calculate the required amount of hydrogen by taking into account a potential traffic congestion and the like in the driving route. When a transit point is set, the driving route may be set for the fuel cell vehicle 10 to drive from the current location through the transit point to the supply position. The transit point may be, for example, a shop where commodities or their raw materials that are not sold but remain are taken over from mobile vending vehicles.

After the processing of step S160, the controller 500 uses the calculated required amount of hydrogen, the remaining amount of hydrogen and the consumed amount of hydrogen per unit time to calculate a power feedable period that represents a remaining time period when the fuel cell vehicle 10 is operable in the power feed mode without causing the remaining amount of hydrogen to become less than the required amount of hydrogen (step S170).

After the processing of step S170, the controller 500 causes information regarding the calculated power feedable period to be displayed on the display unit 50 (step S180). According to the embodiment, the controller 500 converts the power feedable period into business hours of mobile vending and causes the business hours of mobile vending as the power feedable period to be displayed on the display unit 50. The controller 500 then terminates this process and, after elapse of the predetermined time interval, restarts the power feedable period display process from step S110.

Figure 4:
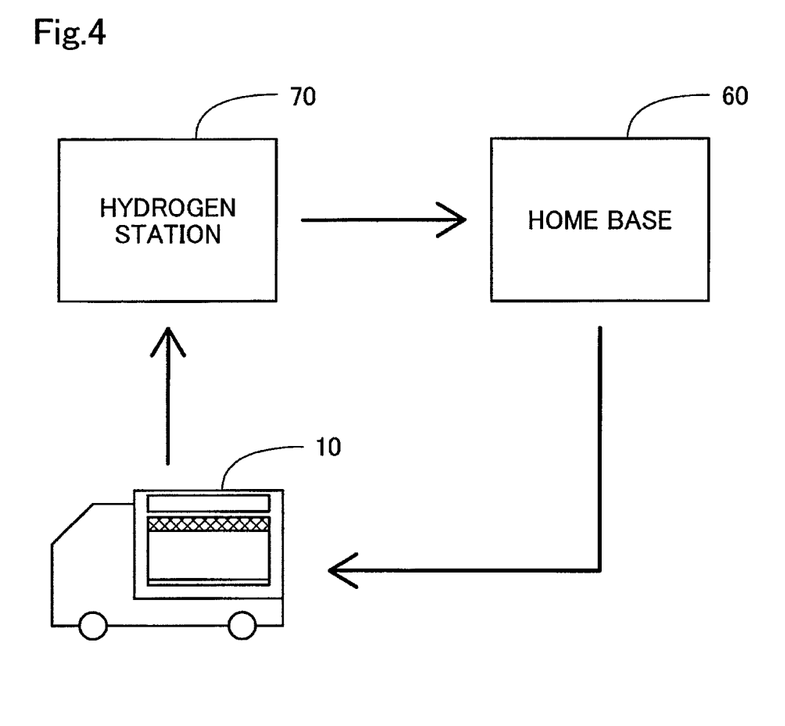
FIG. 4 is a diagram illustrating a driving route of a mobile vending vehicle according to the first embodiment.

FIG. 4 is a diagram illustrating one example of mobile vending performed by using the fuel cell vehicle 10 according to the embodiment. Commodities or their raw materials are supplied to the fuel cell vehicle 10 that serves as a mobile vending vehicle at a home base 60. After receiving the supply of the commodities or their raw materials, the driver drives the fuel cell vehicle 10 from the home base 60 to a place of business.

After reaching the place of business, the driver changes over the operation mode of the fuel cell vehicle 10 from the drive mode to the power feed mode and starts business. When the operation mode of the fuel cell vehicle 10 is changed over to the power feed mode, the controller 500 starts the power feedable period display process. The power feedable period calculated in the power feedable period display process is displayed on the display unit 50 as the business hours of mobile vending.

After elapse of the business hours displayed on the display unit 50, the driver changes over the operation mode of the fuel cell vehicle 10 from the power feed mode to the drive mode and drives the fuel cell vehicle 10 from the place of business to a nearest hydrogen station 70. The hydrogen station 70 is not necessarily limited to a stationary hydrogen station but may include a mobile hydrogen station that is implemented by, for example, a truck equipped with a hydrogen filling device to supply hydrogen at a predetermined location.

After reaching the hydrogen station 70, the driver supplies hydrogen to the fuel cell vehicle 10. After that, the driver may drive the fuel cell vehicle 10 from the hydrogen station 70 to the home base 60 to receive another supply of commodities or their raw materials or may drive the fuel cell vehicle 10 from the hydrogen station 70 to the place of business to restart business.

In the fuel cell vehicle 10 of the embodiment described above, the controller 500 is configured to calculate the power feedable period and display the calculated power feedable period. This configuration informs the driver or the like of the remaining amount of hydrogen stored in the hydrogen tank 211. This accordingly reduces the likelihood that the fuel cell vehicle 10 fails to reach a supply position such as the hydrogen station 70, due to insufficiency of hydrogen for driving. Especially, according to the embodiment, the power feedable period is displayed on the display unit 50 provided in the fuel cell vehicle 10. This configuration effectively informs the driver or the like of the remaining amount of hydrogen stored in the hydrogen tank 211.

According to the embodiment, the fuel cell vehicle 10 is used as a mobile vending vehicle, and the power feedable period is displayed on the display unit 50 as the business hours of mobile vending. This configuration informs customers of mobile vending of the business hours of mobile vending. This enhances the convenience of the customers.

The configuration of this embodiment performs mobile vending by using the electric power generated by the fuel cell 100. This configuration allows for mobile vending even at a location where no external power supply is placed.

The configuration of this embodiment allows for mobile vending without using a generator that consumes gasoline or liquefied petroleum gas as a fuel. This configuration allows for mobile vending with reducing noise pollution and without emission of air contaminants and greenhouse gases.

B. Second Embodiment

Figure 5:
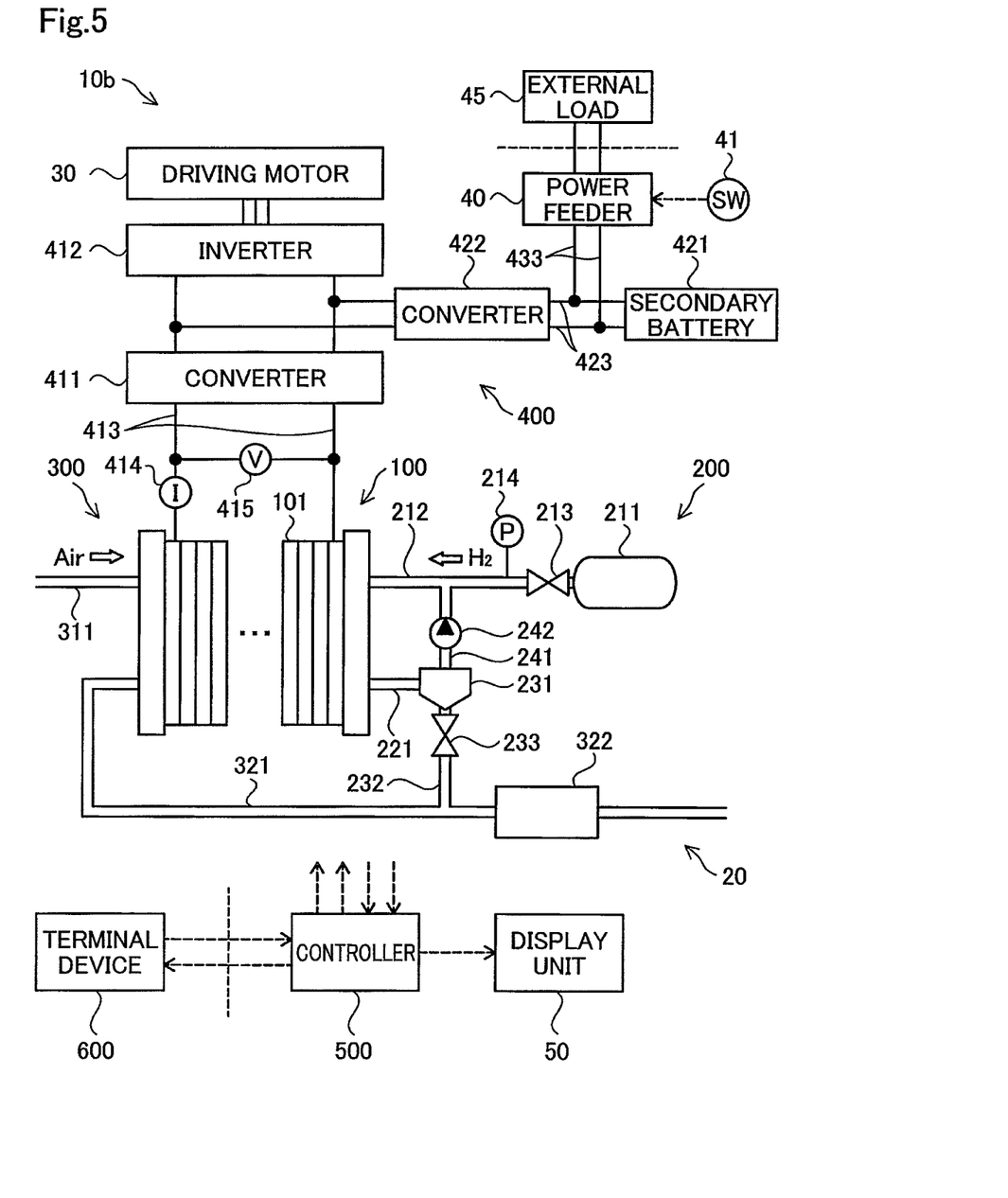
FIG. 5 is a diagram illustrating the schematic configuration of another fuel cell vehicle according to a second embodiment.

FIG. 5 is a diagram illustrating the schematic configuration of a fuel cell vehicle 10b according to a second embodiment. The fuel cell vehicle 10b of the second embodiment differs from the fuel cell vehicle 10 of the first embodiment by that the fuel cell vehicle 10b is not provided with the navigation system 501 but is connected with a terminal drive 600. The other configuration of the fuel cell vehicle 10b is similar to the configuration of the fuel cell vehicle 10 of the first embodiment, unless otherwise specified.

The terminal device 600 is, for example, a smartphone or a table terminal that has an Internet connecting function and that is equipped with a GNSS receiver. According to the second embodiment, the fuel cell vehicle 10b is connected with the terminal device 600 by wired communication or by wireless communication.

The following describes a procedure of the power feedable period display process according to the second embodiment with referring to FIG. 3. According to the second embodiment, the controller 500 uses the GNSS receiver mounted on the terminal device 600 to obtain current location information with regard to the current location of the fuel cell vehicle 10b at step S110.

According to the second embodiment, the controller 500 obtains supply position information from the terminal device 600 at step S120. According to this embodiment, the controller 500 obtains supply position information that is stored in advance in a memory of the terminal device 600. According to another embodiment, the controller 500 may obtain the supply position information on the Internet via the terminal device 600.

The processing of steps S130 to S170 according to the second embodiment is similar to the processing according to the first embodiment described above and is thus not specifically described here.

According to the second embodiment, the controller 500 converts the power feedable period into business hours of mobile vending, causes the business hours of mobile vending as the power feedable period to be displayed on the display unit 50, and also causes the business hours of mobile vending to be displayed on the display of the terminal device 600 at step S180. The controller 500 also causes the business hours of mobile vending and the current location of the fuel cell vehicle 10 to be displayed on a website accessible by customers of mobile vending via the terminal device 600. The controller 500 then terminates this process and, after elapse of the predetermined time interval, restarts the power feedable period display process from step S110.

In the fuel cell vehicle 10b of the second embodiment described above, the power feedable period is displayed on the terminal device 600. This configuration effectively informs the driver or the like of the remaining amount of hydrogen stored in the hydrogen tank 211.

According to the second embodiment, the controller 500 causes the business hours of mobile vending and the current location of the fuel cell vehicle 10 to be displayed on the website accessible by customers. This configuration informs even customers who are away from the place of mobile vending, of the business hours of mobile vending and the place of mobile vending. This configuration further enhances the convenience of the customers.

According to the second embodiment, the power feedable period display process is performed by using the function of the terminal device 600. This simplifies the configuration of the fuel cell vehicle 10.

C. Other Embodiments (C1) The fuel cell vehicles 10 and 10b of the embodiments described above are mobile vending vehicles. The fuel cell vehicle 10 or 10b may be a fuel cell vehicle equipped with an external power feed system configured to supply the electric power generated by the fuel cell 100 to the external load 45, for example, a camper.

(C2) In the fuel cell vehicles 10 and 10b of the embodiments described above, when the commodities or their raw materials of mobile vending are perishable foods, the commodities or their raw materials may be humidified with water generated in the process of power generation of the fuel cell 100. This configuration keeps the freshness of the commodities or their raw materials of mobile vending.

(C3) In the fuel cell vehicles 10 and 10b of the embodiments described above, when the operation mode is changed over to the power feed mode, the power feedable period display process is performed by the controller 500. According to another embodiment, the fuel cell vehicle 10 or 10b may be provided with a switch that prevents the power feedable period display process from being performed. In this embodiment, the driver may turn on this switch, for example, in the event of a disaster to prevent the power feedable period display process from being performed. This accordingly enables the electric power that is expected to be consumed by the power feedable period display process, to be used for power feeding.

(C4) In the fuel cell vehicles 10 and 10b of the embodiments described above, the display unit 50 is an electronic message board provided on the side face of the fuel cell vehicle 10 or 10b. According to another embodiment, the display unit 50 may be an alarm lamp provided in an instrument panel of the fuel cell vehicle 10 or 10b. In this embodiment, the fuel cell vehicle 10 or 10b may start flashing the alarm lamp at a timing when the power feedable period becomes equal to or shorter than a predetermined time period and may start keeping the alarm lamp on at a timing when the power feedable period elapses. This configuration informs the driver or the like of the remaining amount of hydrogen stored in the hydrogen tank 211.

(C5) The fuel cell vehicle 10b of the second embodiment described above is equipped with the display unit 50. The controller 50 causes the power feedable period to be displayed on the display unit 50 and to be displayed on the display of the terminal device 600. According to another embodiment, the fuel cell vehicle 10b may not be equipped with the display unit 50. In this embodiment, the controller 500 may cause the power feedable period to be displayed only on the display of the terminal device 600.

(C6) In the fuel cell vehicle 10b of the second embodiment described above, the controller 500 obtains both the current location information and the supply position information from the terminal device 600. According to another embodiment, the controller 500 may obtain at least one of the current location information and the supply position information from a device other than the terminal device 600. For example, the fuel cell vehicle 10b may be provided with a navigation system 510 that is equipped with a GNSS receiver. The controller 500 may use signals from satellites received by the GNSS receiver of the navigation system 510 to obtain the current location information of the fuel cell vehicle 10b. In another example, the supply position information may be stored in advance in the memory of the controller 500.

(C7) In the fuel cell vehicles 10 and 10b of the embodiments described above, the controller 500 calculates both the required amount of hydrogen and the power feedable period. According to another embodiment, the terminal device 600 or a computer of the home base 60 may calculate at least one of the required amount of hydrogen and the power feedable period. For example, the fuel cell vehicle 10 may be connected with the computer of the home base 60 by wireless communication. The computer of the home base 60 may obtain the current location information of the fuel cell vehicle 10, the fuel consumption of the fuel cell vehicle 10 in the drive mode, the remaining amount of hydrogen stored in the hydrogen tank 211, and the consumed amount of hydrogen per unit time by the fuel cell vehicle 10 in the power feed mode, from the fuel cell vehicle 10. The computer of the home base 60 may use the obtained current location information, the obtained fuel consumption of the fuel cell vehicle 10 in the drive mode, and supply position information stored in advance in the computer of the home base 60 to calculate the required amount of hydrogen. Furthermore, the computer of the home base 60 may use the calculated required amount of hydrogen, the obtained remaining amount of hydrogen and the obtained consumed amount of hydrogen per unit time to calculate the power feedable period. The computer of the home base 60 may convert the power feedable period into business hours of mobile vending and send the converted business hours of mobile vending to the fuel cell vehicle 10. The fuel cell vehicle 10 may cause the business hours of mobile vending received from the computer of the home base 60 to be displayed on the display unit 50. Additionally, the computer of the home base 60 may cause the business hours of mobile vending and the current location of the fuel cell vehicle 10 to be displayed on a website accessible by customers.

(C8) In the fuel cell vehicles 10 and 10b of the embodiments described above, the controller 500 may calculate the business hours of mobile vending with regard to each commodity and display the calculated business hours with regard to each commodity on the display unit 50. For example, mobile vending using the fuel cell vehicle 10 may include sales of hot dogs as a main commodity and additionally include sales of crepes (French pancakes) and French fries. When crepes are cooked by using the same electromagnetic cooker as the electromagnetic cooker used to cook hot dogs and French fries are cooked by using a different electromagnetic cooker from the electromagnetic cooker used to cook hot dogs, the business hours with regard to the French fries may be set separately from the business hours with regard to the hot dogs and crepes. The business hours with regard to the hot dogs and crepes may be set to assure a predetermined time period, while the business hours with regard to the French fries may be set to be shorter than the business hours with regard to the hot dogs and crepes, according to the remaining amount of hydrogen stored in the hydrogen tank 211. After the end of the business hours with regard to the French fries, the controller 500 may restrict the supply of electric power to the electromagnetic cooker used to cook the French fries.

The present disclosure is not limited to any of the embodiments described above but may be implemented by various other configurations without departing from the scope of the disclosure. For example, the technical features of any of the above embodiments corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential herein.

(1) According to one aspect of the present disclosure, there is provided a fuel cell vehicle. This fuel cell vehicle comprises a fuel cell; a hydrogen tank configured to supply hydrogen to the fuel cell; a driving motor driven with electric power generated by the fuel cell; a power feeder configured to supply the electric power generated by the fuel cell to an external load; and a controller configured to control an operation mode of the fuel cell vehicle between a drive mode that supplies electric power to the driving motor and a power feed mode that supplies electric power to the power feeder. The controller is configured to: obtain current location information with regard to a current location of the fuel cell vehicle, supply position information with regard to a supply position where the fuel cell vehicle receives a supply of hydrogen, a fuel consumption of the fuel cell vehicle in the drive mode, a remaining amount of hydrogen stored in the hydrogen tank, and a consumed amount of hydrogen per unit time in the power feed mode; use the current location information and the supply position information to calculate a required amount of hydrogen that is required for the fuel cell vehicle to drive from the current location to the supply position in the drive mode; use the required amount of hydrogen, the remaining amount of hydrogen, and the consumed amount of hydrogen per unit time in the power feed mode to calculate a power feedable period that denotes a time period when the fuel cell vehicle is operable in the power feed mode without causing the remaining amount of hydrogen to become less than the required amount of hydrogen; and display information with regard to the power feedable period. In the fuel cell vehicle of this configuration, the controller calculates the power feedable period and causes the calculated power feedable period to be displayed. This configuration informs a driver or the like of the remaining amount of hydrogen stored in the hydrogen tank. This accordingly reduces the likelihood that the fuel cell vehicle fails to reach the supply position, due to insufficiency of hydrogen for driving.

(2) The fuel cell vehicle of the above aspect may further comprise a display unit. The controller may cause the power feedable period to be displayed on the display unit.

In the fuel cell vehicle of this aspect, the power feedable period is displayed on the display unit. This configuration effectively informs the driver or the like of the remaining amount of hydrogen stored in the hydrogen tank.

(3) The fuel cell vehicle of the above aspect may be connected with a terminal device by wired communication or by wireless communication. The controller may cause the power feedable period to be displayed in the terminal device.

In the fuel cell vehicle of this aspect, the power feedable period is displayed in the terminal device. This configuration effectively informs the driver or the like of the remaining amount of hydrogen stored in the hydrogen tank.

(4) The fuel cell vehicle of the above aspect may be connected with a terminal device by wired communication or by wireless communication. The controller may obtain at least one of the current location information and the supply position information via the terminal device.

This aspect simplifies the configuration of the fuel cell vehicle.

(5) The fuel cell vehicle of the above aspect may be a mobile vending vehicle that is used for mobile vending. The controller may cause the power feedable period to be displayed as business hours of mobile vending.

In the fuel cell vehicle of this aspect, the power feedable period is displayed as the business hours of mobile vending. This configuration informs customers of mobile vending of the business hours of mobile vending. This enhances the convenience of the customers.

The present disclosure may be implemented by any of various aspects other than the aspects of the fuel cell vehicle described above. For example, the present disclosure may be implemented by a method using the fuel cell vehicle, a mobile vending vehicle equipped with a fuel cell, a method of mobile vending by the fuel cell vehicle.

What is claimed is:

1. A fuel cell vehicle, comprising:
   a fuel cell;
   a hydrogen tank configured to supply hydrogen to the fuel cell;
   a driving motor driven with electric power generated by the fuel cell;
   a power feeder configured to supply the electric power generated by the fuel cell to an external load; and
   a controller configured to control an operation mode of the fuel cell vehicle between a drive mode that supplies electric power to the driving motor and a power feed mode that supplies electric power to the power feeder, wherein
   the fuel cell vehicle is a mobile vending vehicle that is used for mobile vending, and
   the controller is configured to:
   obtain current location information with regard to a current location of the fuel cell vehicle, supply position information with regard to a supply position where the fuel cell vehicle receives a supply of hydrogen, a fuel consumption of the fuel cell vehicle in the drive mode, a remaining amount of hydrogen stored in the hydrogen tank, and a consumed amount of hydrogen per unit time in the power feed mode,
   use the current location information and the supply position information to calculate a required amount of hydrogen that is required for the fuel cell vehicle to drive from the current location to the supply position in the drive mode,
   use the required amount of hydrogen, the remaining amount of hydrogen, and the consumed amount of hydrogen per unit time in the power feed mode to calculate a power feedable period that denotes a time period when the fuel cell vehicle is operable in the power feed mode without causing the remaining amount of hydrogen to become less than the required amount of hydrogen, and
   cause business hours for mobile vending from the fuel cell vehicle and the current location of the fuel cell vehicle to be displayed on a website accessible by customers of the mobile vending from the fuel cell vehicle.

2. The fuel cell vehicle according to claim 1, further comprising:
   a display unit, wherein
   the controller causes the power feedable period to be displayed on the display unit.

3. The fuel cell vehicle according to claim 1,
   the fuel cell vehicle being connected with a terminal device by wired communication or by wireless communication, wherein
   the controller causes the power feedable period to be displayed in the terminal device.

4. The fuel cell vehicle according to claim 1,
   the fuel cell vehicle being connected with a terminal device by wired communication or by wireless communication, wherein
   the controller obtains at least one of the current location information and the supply position information via the terminal device.

5. The fuel cell vehicle according to claim 1,
   wherein
   the controller causes the power feedable period to be displayed as the business hours of mobile vending.

6. A method of using a fuel cell vehicle,
   the fuel cell vehicle comprising:
   a fuel cell;
   a hydrogen tank configured to supply hydrogen to the fuel cell;
   a driving motor driven with electric power generated by the fuel cell; and
   a power feeder configured to supply the electric power generated by the fuel cell to an external load, wherein
   the fuel cell vehicle is operated in either one of a drive mode and a power feed mode, and the drive mode supplies electric power to the driving motor and the power feed mode supplies electric power to the power feeder, and
   the fuel cell vehicle is a mobile vending vehicle that is used for mobile vending,
   the method comprising:
   obtaining current location information with regard to a current location of the fuel cell vehicle, supply position information with regard to a supply position where the fuel cell vehicle receives a supply of hydrogen, a fuel consumption of the fuel cell vehicle in the drive mode, a remaining amount of hydrogen stored in the hydrogen tank, and a consumed amount of hydrogen per unit time in the power feed mode, using the current location information and the supply position information to calculate a required amount of hydrogen that is required for the fuel cell vehicle to drive from the current location to the supply position in the drive mode, using the required amount of hydrogen, the remaining amount of hydrogen, and the consumed amount of hydrogen per unit time in the power feed mode to calculate a power feedable period that denotes a time period when the fuel cell vehicle is operable in the power feed mode without causing the remaining amount of hydrogen to become less than the required amount of hydrogen, and displaying business hours for mobile vending from the fuel cell vehicle and the current location of the fuel cell vehicle on a website accessible by customers of the mobile vending from the fuel cell vehicle.

* * * * *